United States Patent Office 2,975,186
Patented Mar. 14, 1961

2,975,186

CERTAIN HALOALKYLOLAMINO PYRIDINES

Russell M. Bimber, Painesville, Ohio, assignor to Diamond Alkali Company, Cleveland, Ohio, a corporation of Delaware No Drawing. Filed Apr. 24, 1957, Ser. No. 654,672

10 Claims. (Cl. 260—296)

This invention relates to novel substituted-2-(2,2,2-trihalo-1-hydroxyethylamino)-pyridines, their preparation and application.

More specifically, this invention relates to substituted 2 - (2,2,2-trihalo-1-hydroxyethylamino)-pyridines having the structure

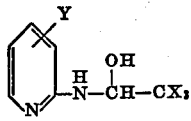

wherein Y is an alkyl group, preferably a lower alkyl such as methyl, ethyl, propyl, butyl, and the like, and X is a halogen, the term "halogen" being used to include fluorine, chlorine, bromine and iodine, although chlorine is preferred.

Illustrative specific compounds of the above type forming a part of this invention are the following:

4 - methyl - 2-(2,2,2-trichloro-1-hydroxyethylamino)-pyridine.
3 - methyl - 2-(2,2,2-trichloro-1-hydroxyethylamino)-pyridine.
5 - methyl - 2-(2,2,2-trichloro-1-hydroxyethylamino)-pyridine.
6 - methyl - 2-(2,2,2-trichloro-1-hydroxyethylamino)-pyridine.

The practice of this invention contemplates various compounds within the generic structure indicated above, monomethyl - substituted - 2-(2,2,2-trichloro-1-hydroxyethylamino)-pyridines constituting an especially preferred type of compound.

Generally, compounds embodying the present invention may be formed by reacting chloral with an appropriately substituted amino-pyridine such as 2-amino-4-methyl-pyridine, 2-amino-3-methyl-pyridine, 2-amino-5-methyl-pyridine, 2-amino-6-methyl-pyridine or other lower alkyl-substituted amino-pyridines. The reaction may be carried out in a solvent such as benzene, preferably using approximately equimolar proportions of chloral and the desired amino-alkyl-substituted-pyridine.

Compounds of this invention exhibit biological activity as will be set forth in some detail hereinafter in the specific examples. These compounds may be employed in a variety of formulations, both liquid and solid, including finely-divided powders, granular materials, as well as various liquid solutions, concentrates, emulsifiable concentrates, slurries, and the like, depending upon the application intended and the formulation media employed.

Hence, it will be appreciated that it is contemplated that compounds of this invention form biologically active ingredients which may be employed as an essential ingredient in various compositions which may include such diluents, extenders, fillers, conditioners, solvent, and the like as various clays, diatomaceous earth, talc, spent catalyst, alumina silica materials and such liquids as water and various organic liquids such as acetone, kerosene, benzene, toluene, xylene, and other petroleum distillate fractions or mixtures thereof. When liquid formulations are employed or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol).

In order that those skilled in the art may more completely understand the present invention and the preferred methods by which the same may be carried into effect, the following specific examples are offered:

EXAMPLE I

Part A

Into a 3-necked, round-bottomed flask equipped with an agitator, thermometer, and reflux condenser are introduced 0.3 mol of 2-amino-4-methyl-pyridine in 100 ml. of benzene, and then 0.3 mol chloral is added. An exothermic reaction ensues and by maintaining the reaction mass temperature between 35° and 55° C., there is obtained 75 gm. of a product melting at 123°–128° C.

The product is washed thoroughly with about 300 ml. of warm chloroform and allowed to air-dry at room temperature. The resultant product is then recrystallized from about 200 ml. benzene mixed with 300 ml. of acetone and yields 45 gm. of shiny white crystals melting at 138°–140° C. These crystals are dried three hours at 75° C. and have the following chemical analysis wherein the amounts reported are in terms of percent by weight, indicating the desired product $C_8H_9Cl_3N_2O$.

| Element | Calculated | Found |
|---|---|---|
| C | 37.63 | 37.97 |
| H | 3.53 | 3.57 |
| N | 10.98 | 10.91 |

Part B

To demonstrate the fungicidal effectiveness of the compounds of this invention, an experiment to indicate effectiveness as a tomato foliage protectant against early blight fungi (*Alternaria solani*) is carried out by spraying test tomato plants with aqueous formulations containing 2000 and 400 parts per million, respectively, of the product of Part A, the formulations being prepared by using 5% acetone as a solvent and 0.01% Triton X-155 as an emulsifier. The thus-treated plants are then sprayed with conidia of *A. solani*, incubated for 24 hours in a saturated atmosphere at 70° F. and removed to a greenhouse where a lesion count is made. It is observed that at 2000 parts per million a 90% control of the blight is achieved. At the lower concentration of 400 parts per million a 46% control is observed.

Part C

The compound of Part A is applied at a concentration of 250 mg. per pot to the soil in 4-inch diameter clay pots containing growing tomato, bean and corn plants. Rating the observed phytotoxicity in terms of a scale ranging from 0 indicating no effect on the plant to a valve of 11 indicating that the plant is killed, it is observed that the corn plants are killed, a rating of 10 is observed re the tomato plants, and against the bean plants, a rating of 5 is noted, thus indicating a high degree of phytotoxicity and biological activity via systemic action.

Part D

The product of Part A is formulated into a 25% wettable powder and dispersed in water to provide an actual concentration of 1% of the compound of Part A. Cranberry bean plants are dipped into this solution, removed and dried, and have early third instar stage Mexican bean beetles caged thereon. Forty-eight hours after treatment it is observed that there is a 50% mortality of the beetles, no plant injury and 45% feeding thereon. This data compared to an untreated plant with respect to which no insect mortality is known and 100% feeding is observed indicates that the compound of Part A acts as an effective insecticide.

EXAMPLE II

Part A

There are mixed together 50 ml. chloral and 79 gm. 2-amino-3-methyl-pyridine in 250 ml. benzene, the temperature being maintained below 50° C. and the reaction mass allowed to stand overnight to obtain 70 gm. of a crude product melting at 95°–100° C. The product is dissolved in chloroform, filtered and allowed to cool. Part of the chloroform is then stripped off under reduced pressure and hexane is added to the concentrated solution to induce crystallization.

Recrystallization is carried out three times using hexane and chloroform to yield a product melting at 100°–103° C. This product is further recrystallized from toluene, using charcoal, to yield 26 gm. of white crystals melting at 103.5°–104.5° C. Chemical analysis of this product indicates the desired $C_8H_9Cl_3N_2O$ and is as follows:

| Element | Actual | Calculated |
|---|---|---|
| C | 29.77 | 29.7 |
| H | 2.38 | 2.47 |
| N | 17.29 | 17.3 |

Part B

The procedure of Example I, Part C, is repeated using the compound of Example II, Part A. The resultant phytotoxicity ratings observed on tomato, bean and corn plants are 10, 5, and 9, respectively, thus indicating high degree of phytotoxicity in soil application.

Part C

The procedure of Example I, Part D, is repeated using the compound of Example II, Part A. Forty-eight hours after treatment an insect mortality of 80% is observed, thus indicating a high degree of insecticidal activity.

EXAMPLE III

Part A 50 ml. of chloral is added to 79 gm. of 2-amino-5-methylpyridine in 250 ml. of benzene below 50° C. and the reaction mixture is allowed to stand at room temperature overnight. There results 174 gm. (93% theoretical yield) of light tan crystals melting at 126°–129° C. The product is recrystallized from chloroform yielding a first crop of 51.0 gm. crystals which are dried overnight at 50° C., melting at 128°–129.5° C. The chemical analysis of these crystals is as follows indicating the preparation of the desired $C_8H_9Cl_3N_2O$.

| Element | Calculated | Actual |
|---|---|---|
| C | 37.6 | 37.7 |
| H | 3.5 | 3.3 |
| Cl | 41.7 | 42.4 |

Part B

The procedure of Example I, Part B, is repeated using the compound of Example III, Part A. There is observed a 70% control of *A. solani* using the compound at a concentration of 2000 parts per million and a 38% control at a concentration of 400 parts per million.

Part C

The procedure of Example I, Part C, is repeated using the compound of Example III, Part A. The phytotoxicity ratings obtained against tomato, bean and corn plants, are 10, 5 and 11, respectively, thus indicating a high degree of phytotoxicity in soil application.

Part D

The procedure of Example I, Part D, is repeated using the compound of Example III, Part A. Forty-eight hours after treatment there is observed a 90% insect mortality with no plant injury.

EXAMPLE IV

Part A 50 ml. of chloral is added to 79 gm. of 2-amino-6-methylpyridine in 250 ml. of benzene below 45° C. and the resultant mixture maintained in a refrigerator overnight. The product obtained is recrystallized from a mixture of benzene and ether yielding a first crop of crystals which are washed with benzene and dried four hours at 50° C. These crystals have a melting point of 108°–110° C. and a chemical composition as follows, indicating the preparation of the desired $C_8H_9Cl_3N_2O$:

| Element | Calculated | Found |
|---|---|---|
| C | 37.63 | 37.79 |
| H | 3.53 | 3.46 |
| Cl | 41.7 | 42.1 |

Part B

The compound of Part A is applied at a dosage of 250 mg. to 4-inch clay pots, each containing growing bean plants afflicted with bean rust, the compound being applied directly to the soil. A systemic control of bean rust is observed, the total number of spots on the leaves being two while untreated check plants exhibit 332 spots. There is also observed at the concentration used, a considerable amount of marginal burn on cotyledonary leaves and on buds as well as a thinning of the plant.

Part C

The procedure of Example I, Part C, is repeated with the result that on tomato and bean plants phytotoxicity values of 10 and 5, respectively, are obtained.

Part D

The procedure of Example I, Part D, is repeated. After 48 hours an insect mortality of 100% is noted with slight plant injury as compared to a 0% mortality on untreated plants.

It is to be understood that although the invention has been described with specific reference to particular embodiments thereof, it is not to be so limited, since changes and alterations therein may be made which are within the full intended scope of this invention as defined by the appended claims.

What is claimed is:

1. A 2 - (2,2,2 - trihalo - 1 - hydroxyethylamino)-pyridine of the formula:

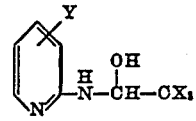

wherein Y is lower alkyl and X is halogen.

2. A 2 - (2,2,2 - trihalo - 1 - hydroxyethylamino)-pyridine of the formula:

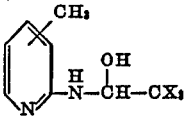

wherein X is halogen.

3. A 2 - (2,2,2 - trichloro - 1 - hydroxyethylamino)-pyridine of the formula:

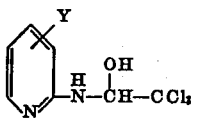

wherein Y is lower alkyl.

4. A 2 - (2,2,2 - trichloro - 1 - hydroxyethylamino)-pyridine of the formula:

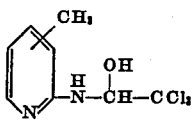

5. 4 - methyl - 2 - (2,2,2 - trichloro - 1 - hydroxyethylamino) - pyridine.
6. 3 - methyl - 2 - (2,2,2 - trichloro - 1 - hydroxyethylamino) - pyridine.
7. 5 - methyl - 2 - (2,2,2 - trichloro - 1 - hydroxyethylamino) - pyridine.
8. 6 - methyl - 2 - (2,2,2 - trichloro - 1 - hydroxyethylamino) - pyridine.

9. The method of preparing a 2-(2,2,2-trichloro-1-hydroxyethylamino)-pyridine of the formula:

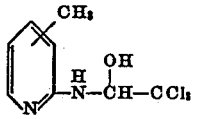

which comprises reacting substantially equimolar amounts of chloral and an amino-pyridine having a methyl group attached to one of the carbon atoms.

10. The method according to claim 9 wherein the reaction is conducted using benzene as a reaction medium.

References Cited in the file of this patent

UNITED STATES PATENTS

| | | |
|---|---|---|
| 2,807,619 | Cislak | Sept. 24, 1957 |
| 2,823,987 | Fielden | Feb. 18, 1958 |
| 2,843,520 | Kittila | July 15, 1958 |

OTHER REFERENCES

Steinhauser: J. Chem. Soc., vol. 110, part 1 (1916), pp. 739–741.